(No Model.)
J. E. SCHNEIDER.
DEVICE FOR SECURING HORSES WHILE SHOEING.
No. 556,778. Patented Mar. 24, 1896.
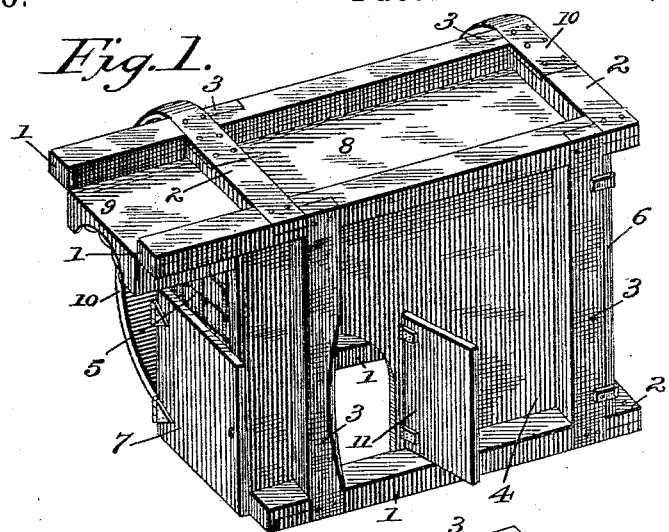
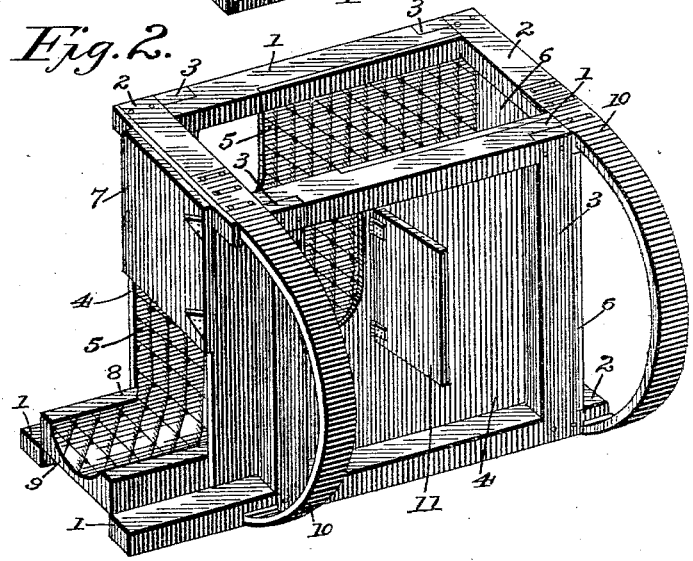
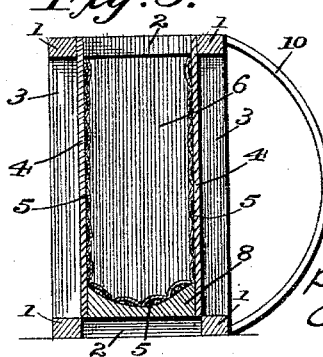
Witnesses
Edwin G. McKee,
E. H. Bond
Inventor
J. E. Schneider
By John Wedderburn
Attorney

UNITED STATES PATENT OFFICE.

JOSEPH E. SCHNEIDER, OF LANCASTER, CALIFORNIA.

DEVICE FOR SECURING HORSES WHILE SHOEING.

SPECIFICATION forming part of Letters Patent No. 556,778, dated March 24, 1896.

Application filed July 12, 1895. Serial No. 555,787. (No model.)

*To all whom it may concern:*

Be it known that I, JOSEPH E. SCHNEIDER, a citizen of the United States, residing at Lancaster, in the county of Los Angeles and State of California, have invented certain new and useful Improvements in Devices for Securing Horses While Shoeing; and I do hereby declare the following to be a full, clear, and exact description of the invention, such as will enable others skilled in the art to which it appertains to make and use the same.

This invention relates to improvements in devices for holding horses, mules, oxen, and the like while shoeing them, the object of the invention being to provide a simple and cheap device into which the animal may be conveniently driven and having means whereby the device, with the animal therein, may be turned so as to bring the horse on his back, fastening his feet, and afterward returning the same to place after the operation of shoeing has been completed.

Other objects and advantages of the invention will hereinafter appear, and the novel features thereof will be specifically defined by the appended claims.

The invention in this instance resides in the peculiar construction and the combination and arrangement of parts, all as more fully hereinafter described, shown in the drawings, and then particularly pointed out in the claims.

The invention is clearly illustrated in the accompanying drawings, which, with the numerals of reference marked thereon, form a part of this specification, and in which—

Figure 1 is a perspective view of my improved horse-holding device. Fig. 2 is a view thereof when turned over. Fig. 3 is a vertical cross-section through the same.

Like numerals of reference indicate like parts throughout the several views.

In the drawings, 1 designates the longitudinal timbers or beams of the frame, and 2 the cross-beams thereof, the same being secured together in any suitable manner and also to the uprights 3. The end and two sides are inclosed by suitable boarding 4, the inner faces of which are padded, as shown at 5, At the rear end is a hinged door 6, which may be hung to swing upward or on vertical pintles, as may be desired. At the front end is a hinged door 7, which extends for only a portion of the height of the frame, as shown, so as to permit the animal to have his head out of the opening above said door, if desired. The top 8 extends beyond the end of the frame, as shown at 9, and is hollowed out to form a trough when the device is turned upside down, as seen in Fig. 2.

10 are rockers which are secured to the top and bottom cross-beams, as shown, and which rockers are arranged upon one side of the device. The bottom of the frame is not inclosed, so that when the device is turned up in the position it occupies when in the act of shoeing the animal it will be open at the top. Near the front end upon each side is a hinged door 11, through which the front legs or hoofs of the animal may be passed or through which they may be gotten at for shoeing.

In use the animal is led or driven into the housing or frame, the doors closed and fastened, and then the device is turned over on its rockers, and the animal is thus thrown upon his back. His feet may be secured in any suitable manner and the operation of shoeing performed, after which the feet are released and the frame turned back into its normal position and the horse removed.

The padded walls of the device prevent injury to the animal, and the upturning of the device places the horse in such position that the person shoeing it cannot be injured in any way.

What is claimed as new is—

1. A device for the purpose described consisting of a frame or stall padded on the inside and provided upon one side with rockers, substantially as specified.

2. The herein-described apparatus for securing horses while being shod, the same comprising a frame or stall padded on the inside and provided with side doors near one end and rockers upon one side, substantially as and for the purpose specified.

3. The herein-described apparatus for securing horses while being shod, consisting of longitudinal timbers and cross-beams secured thereto, uprights, padding upon the inner faces of the top and two sides, a hinged door at the rear end, a hinged door at the front end, the top being extended beyond the end of the frame and hollowed out, hinged doors near the front upon each side and rockers secured to the top and bottom cross-beams, all substantially as and for the purposes specified.

In testimony whereof I have signed this specification in the presence of two subscribing witnesses.

JOSEPH E. SCHNEIDER.

Witnesses:
W. G. HANES,
H. S. ADNEY.